J. KARITZKY.
CONDUIT OR CABLE CLAMP AND BRIDLE RING.
APPLICATION FILED OCT. 14, 1920.

1,381,200. Patented June 14, 1921.

UNITED STATES PATENT OFFICE.

JOHN KARITZKY, OF GARWOOD, NEW JERSEY, ASSIGNOR TO HENRY B. NEWHALL, AS EXECUTOR OF HENRY B. NEWHALL, SR., DECEASED.

CONDUIT OR CABLE CLAMP AND BRIDLE-RING.

1,381,200.   Specification of Letters Patent.   Patented June 14, 1921.

Application filed October 14, 1920. Serial No. 416,981.

*To all whom it may concern:*

Be it known that I, JOHN KARITZKY, a citizen of the United States, residing at Garwood, in the county of Union and State of New Jersey, have invented certain new and useful Improvements in Conduit or Cable Clamps and Bridle-Rings, of which the following is a specification, taken in connection with the accompanying drawings.

My invention relates to the combination of a conduit or cable clamp and a bridle ring, and also to a cable or conduit clamp and a bridle ring as sub-combinations of the main combination, and as articles of manufacture.

My invention further relates to a cable or conduit clamp, which can be manufactured at minimum expense and to which a bridle ring may be secured either at the original installation of the cable and conduit clamp, or at any future time when it may be desirable to support one or more runs of bridle wires.

My invention further relates to a conduit or cable clamp in which the base is provided with a hook extending above the surface of the base and parallel with the longitudinal axis of the clamp and over which a bridle ring hook is snapped to hold the bridle ring to the conduit or cable clamp without loosening the securing screw.

My invention further relates to additional means mounted on the base to engage and steady the bridle ring and prevent it from becoming disengaged from the hook.

My invention further relates to a conduit or cable clamp which is preferably formed out of pressed sheet material, as pressed steel, or which may be formed from castings of malleable iron, brass, an alloy, aluminum or any other metal.

My invention further relates to certain combinations, sub-combinations, articles of manufacture, and details of construction, all of which will be more fully hereinafter described and pointed out in the claims.

In the figures, in which I have shown different embodiments of my invention, the same reference numerals refer to similar parts in the several figures.

Figure 1:
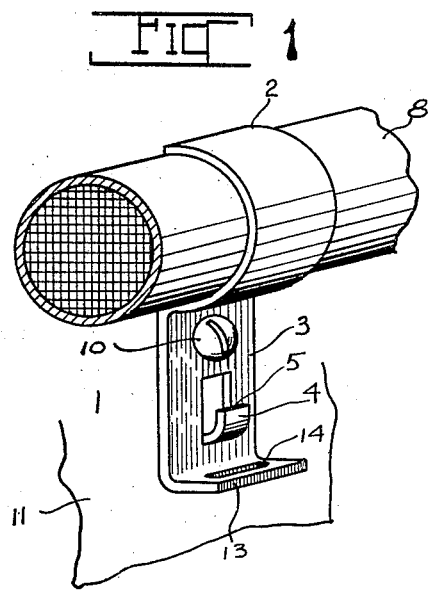
Figure 1 is a perspective view of my conduit or cable clamp and of a cable which it supports.

In the commercial use of conduit or cable clamps it is not generally possible, at the date of the original installation, to determine whether or not bridle rings will be needed to support additional loose strands of bridle wires. In commercial practice, a cable is supported on a wall or other suitable support and it may be weeks, months, or years later that the telephone engineers will determine that it is desirable to support bridle wires parallel to the cable.

By my invention my original conduit or cable clamp may be used as a separate article of manufacture or sub-combination, and then later, when the needs of the service demand it, my bridle ring may be supported by the same conduit or cable clamp, when the complete combination would be used.

In my invention I form my conduit or cable clamp 1 with a hook portion 2 and a base 3. This base I provide with a hook 4 extending parallel with the longitudinal axis of the conduit or cable clamp. If the clamp is formed of cast metal this hook may be cast as shown in the drawing. Preferably, however, the conduit or cable clamp is formed from pressed sheet material in which case the hook 4 is pressed up from the base and remains rigid. The end 5 of the hook 4 is so positioned that the hook 6 of the bridle ring 7 has to be snapped over it.

Whenever it is found that the traffic load upon the cable 8 is excessive and the telephone engineers want to increase the capacity of the installation, without going to the expense of taking down the cable 8 and installing a larger one, runs of bridle wires 9, 9 may be quickly added to the clamp without loosening the securing screw 10 in the wall or other suitable support 11.

By my invention I form my bridle ring 7 with a pigtail 18, the other end being formed into a U-shaped hook 6 by bending the arm 12 back upon the bridle ring. This hook 6 is snapped over the hook 4 on the base 3 by simple manipulation when the runs of bridle wires 9, 9 can be threaded through the pigtail 18.

I also preferably, though not necessarily, employ additional means on the conduit or cable clamp to engage the bridle ring and prevent it from becoming disengaged from the hook 4.

Figure 2:
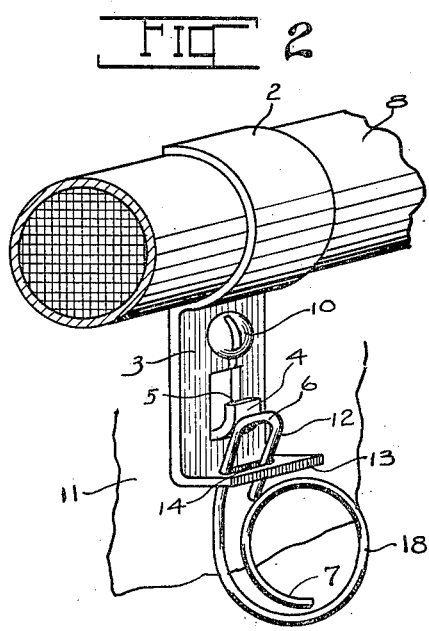
Fig. 2 is a perspective view of the conduit or cable clamp shown in Fig. 1 with the addition of the bridle ring which is shown being inserted through the slot in the flange and about to be snapped over the hook.
Figure 3:
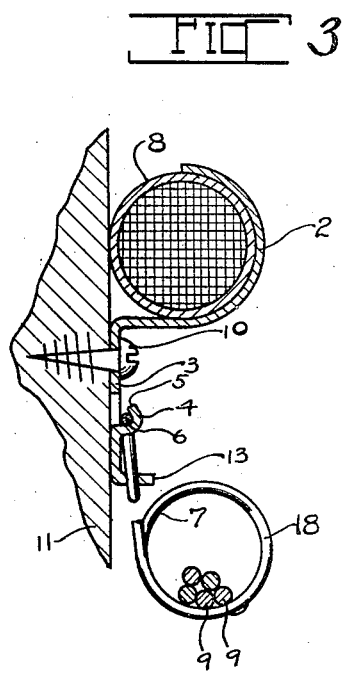
Fig. 3 is a vertical section through Fig. 2 with the bridle ring shown snapped over the hook.
Figure 4:
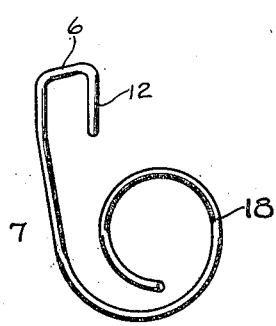
Fig. 4 is a detail perspective view of the bridle ring.

The means, which I preferably employ, is a flange 13 provided with a slot 14. In attaching the bridle ring 7 to the conduit or cable clamp 1, the hook 6 is brought beneath the conduit or cable clamp and forced upward through the slot 14, see Fig. 2, then rocked slightly so that the hook 6 will move away from the wall until it escapes the end 5 of the hook 4 on the base 3. The pigtail 18 of the bridle ring is then pulled outward which causes the bridle ring to pivot in the slot 14, bringing the bridle ring hook 6 over the end 5 of the hook 4. By then pulling down sharply upon the pigtail 18 of the bridle ring, the hook 6 is caused to snap back of the hook 4 and assume the position shown in Fig. 3. The U-shaped hook 6 with the arm 12 fills the slot 14 and prevents substantially any lateral movement of the bridle ring with relation to the hook 4 or conduit or cable clamp 1, and any rattle of the bridle ring in the slot.

This makes a very cheap, serviceable and strong combined conduit or cable clamp and bridle ring, and one in which the bridle ring can be attached or detached from the clamp by simple manipulation without loosening the securing screw 10.

Having thus described this invention in connection with an illustrative embodiment thereof, to the details of which I do not desire to be limited, what is claimed as new and what is desired to secure by Letters Patent is set forth in the appended claims.

What I claim is:—

1. A conduit or cable clamp provided with a hook portion to support a cable and a base, the base being provided with another integral hook extending parallel with the longitudinal axis of the conduit or cable clamp to support a bridle ring.

2. The combination of a conduit or cable clamp provided with a hook portion to support a conduit or cable, a base to lie against a wall or other support, the base being provided with a hook extending parallel with the longitudinal axis of the clamp and with a slotted flange, a bridle ring having a hook at one end adapted to be threaded through the slot and hooked over the hook on the base.

JOHN KARITZKY.

Witnesses:
F. N. KARITZKY,
BERNARD C. KRANS.